(12) United States Patent
Asoh et al.

(10) Patent No.: US 8,316,119 B2
(45) Date of Patent: Nov. 20, 2012

(54) METHOD FOR SWITCHING CONNECTIONS BETWEEN AN IP-ONLY PHONE AND A SOFT PHONE TO A SERVER (75) Inventors: Junichi Asoh, Machida (JP); Tatsumi Nagasawa, Machida (JP)

(73) Assignee: Lenovo (Singapore) Pte Ltd., Singapore (SG)

( * ) Notice: Subject to any disclaimer, the term of this patent is extended or adjusted under 35 U.S.C. 154(b) by 1126 days.

(21) Appl. No.: 12/195,680

(22) Filed: Aug. 21, 2008

(65) Prior Publication Data
US 2008/0310403 A1    Dec. 18, 2008

(30) Foreign Application Priority Data
May 9, 2007    (JP) ................................. 2007-229675

(51) Int. Cl.
*G06F 15/173* (2006.01)
(52) U.S. Cl. ...................................................... 709/223
(58) Field of Classification Search .................... 397/900
See application file for complete search history.

(56) References Cited

U.S. PATENT DOCUMENTS

| | | | | |
|---|---|---|---|---|
| 7,212,102 B1 * | 5/2007 | Meitzen et al. | ............... | 340/333 |
| 7,522,876 B1 * | 4/2009 | Meitzen et al. | ................... | 455/7 |
| 7,610,047 B2 * | 10/2009 | Hicks et al. | ................... | 455/433 |
| 2006/0268738 A1 * | 11/2006 | Goerke et al. | ................. | 370/254 |
| 2007/0036118 A1 * | 2/2007 | Shaffer et al. | ................. | 370/338 |
| 2007/0121596 A1 * | 5/2007 | Kurapati et al. | ............... | 370/356 |

FOREIGN PATENT DOCUMENTS

| | | |
|---|---|---|
| JP | 06-187163 | 7/1994 |
| JP | 07-264653 | 10/1995 |
| JP | 2001-197210 | 7/2001 |
| JP | 2002-204473 | 7/2002 |
| JP | 2005-027247 | 1/2005 |
| JP | 2006-157158 | 6/2006 |
| JP | 2006-311173 | 9/2006 |
| JP | 2007-036598 | 2/2007 |

* cited by examiner

*Primary Examiner* — Fan Ng
(74) *Attorney, Agent, or Firm* — Antony P. Ng; Yudell Isidore Ng Russell PLLC (57) ABSTRACT

A method for switching connections between an IP-only phone and a soft phone to an IP gateway server is disclosed. An identical telephone number is allocated to the IP-only phone and the soft phone. When the soft phone has been moved such that a connection destination to a local-area network changes from a first connector to a second connector, a relay device is also changed from a first relay device to a second relay device. After recognizing its present position by a MAC address of the relay device to which it is currently connected, the soft phone issues a request to an IP gateway server to change an IP address to the soft phone when it is determined that the soft phone is located far away from the IP-only phone. When it is determined that the soft phone is located near the IP-only phone, the soft phone issues a request to the IP gateway server so that the IP address is changed to the IP-only phone.

14 Claims, 5 Drawing Sheets

| TELEPHONE NUMBER | MAC ADDRESS | IP ADDRESS |
|---|---|---|
| 12-345-6789 | 04-A3-43-5F-43-23 | aa-bb-cc-dd |
| xx-xxx-xxxx | xx-xx-xx-xx-xx-xx | xx-xx-xx-xx |
| xx-xxx-xxxx | xx-xx-xx-xx-xx-xx | xx-xx-xx-xx |

Fig. 4A

| TELEPHONE NUMBER | MAC ADDRESS | IP ADDRESS |
|---|---|---|
| 12-345-6789 | 05-B4-54-60-54-34 | aa-bb-cc-de |
| xx-xxx-xxxx | xx-xx-xx-xx-xx-xx | xx-xx-xx-xx |
| xx-xxx-xxxx | xx-xx-xx-xx-xx-xx | xx-xx-xx-xx |

| RJ-45 | PORT ADDRESS | DESTINATION MAC ADDRESS |
|---|---|---|
| #1 | 00 | 04-A3-43-5F-43-23 |
| #2 | 01 | 05-B4-54-60-54-34 |
| #3 | 02 | |
| #4 | 03 | |
| #5 | 04 | |
| #6 | 05 | |

Fig. 5B

METHOD FOR SWITCHING CONNECTIONS BETWEEN AN IP-ONLY PHONE AND A SOFT PHONE TO A SERVER

PRIORITY CLAIM

The present application claims benefit of priority under 35 U.S.C. §§120, 365 to the previously filed Japanese Patent Application No. JP2007-229675 entitled, "Switching method of IP phone and mobile information terminal" with a priority date of Sep. 5, 2007, which is incorporated by reference herein.

BACKGROUND OF THE INVENTION

1. Technical Field

The present invention relates to Voice over Internet Protocol (VoIP) telephony in general, and in particular to VoIP telephones. More particularly, the present invention relates to a method for switching connections between a VoIP telephone and a soft phone to a gateway server.

2. Description of Related Art

Internet Protocol (IP) telephony is a service that enables transmission of voice or video over an Internet Protocol based network by using a Voice over Internet Protocol (VoIP) technology. The IP telephony service is increasingly adopted for use in homes and businesses because of the widespread of Internet, the relatively low communication cost and the improved voice quality. Within a building, an IP phone can be used in both internal and external extension calls by integrating an IP telephony network into a local-area network (LAN).

As an example of a terminal equipment for use in the IP telephony service, an IP-only phone having a telephone transceiver and operational buttons like a general telephone can be directly connected to a LAN. In addition to the IP-only phone, a software phone (also known as a soft phone) is basically a computer configured to be usable as an IP phone by incorporating an IP telephony software for converting voice into a signal for the computer as well as connecting a handset and a headset to the computer. The soft phone is an integration of hardware and software, implementing the functionalities of the IP telephony.

A soft phone can reduce costs and save spaces on a desk by eliminating an IP-only phone. When the soft phone is implemented in a notebook personal computer (PC) equipped with a wireless LAN device, users can advantageously enjoy the soft phone at arbitrary locations within the coverage of the wireless LAN. This is also advantageous when the notebook PC is equipped with a wired LAN and when wired LAN connectors are installed at appropriate locations within a building.

However, users cannot use a soft phone until the computer starts up and valuable time can be wasted on waiting for the computer to be ready. Also, a soft phone has limited functions compared with an IP-only phone, and wearing of the headset is somewhat troublesome and inconvenient. In some cases, a soft phone may not be very stable due to mismatches with other software already installed in the computer.

SUMMARY OF THE INVENTION

In accordance with a preferred embodiment of the present invention, an identical telephone number is allocated to an IP-only phone and a soft phone. When the soft phone has been moved such that a connection destination to a local-area network (LAN) changes from a first connector to a second connector, a relay device is also changed from a first relay device to a second relay device. After recognizing its present position by a MAC address of the relay device to which it is currently connected, the soft phone issues a request to an IP gateway server to change an IP address to the soft phone when it is determined that the soft phone is located far away from the IP-only phone. When it is determined that the soft phone is located near the IP-only phone, the soft phone issues a request to the IP gateway server so that the IP address is changed to the IP-only phone.

All features and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

Figure 1:
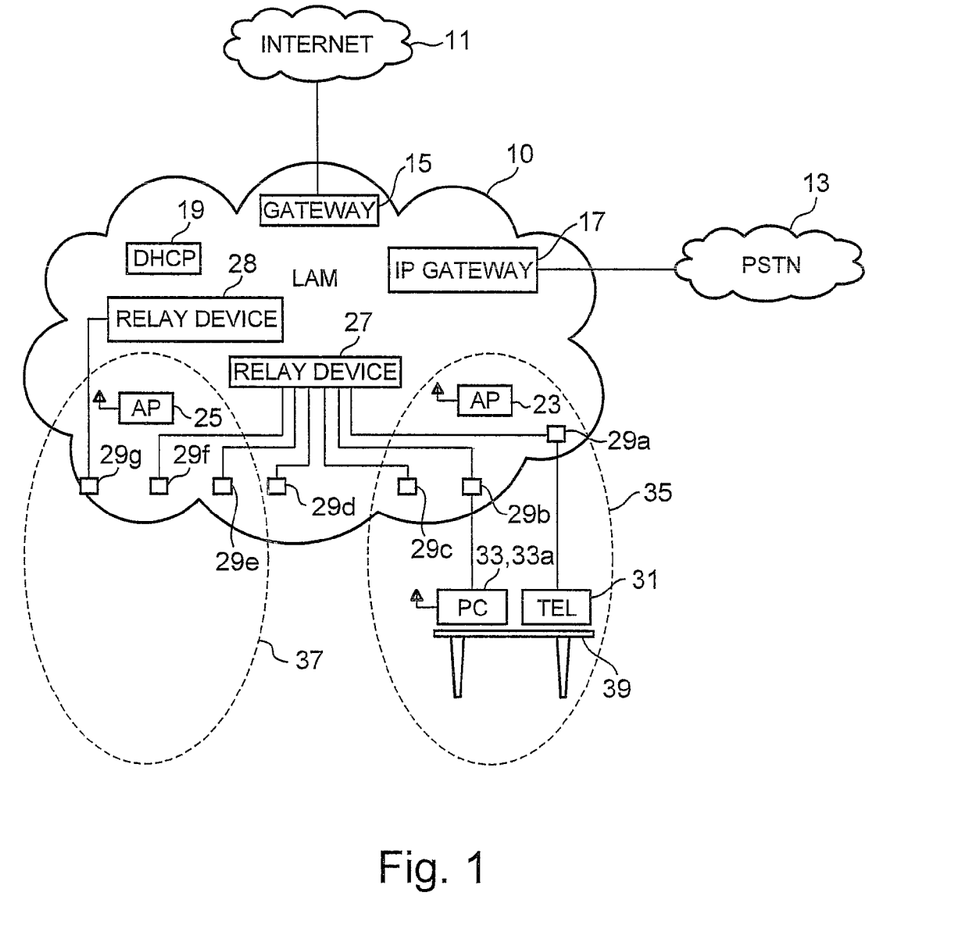
FIG. 1 is a block diagram of a network structure in which a preferred embodiment of the present invention is incorporated.

FIG. 1 is a block diagram of a network structure in which a preferred embodiment of the present invention is incorporated. A local-area network (LAN) 10 enables intercommunications through wired medium or wireless medium between devices and terminals at multiple locations within a limited range of area in enterprises or public facilities. The LAN 10 is connected to a network, such as Internet 11, through a gateway server 15. The LAN 10 is also connected to a public switched telephone network (PSTN) 13 through an IP gateway server 17.

The LAN 10 employs the Ethernet IEEE 802.3 protocol, which is one of the standard LAN protocols formulated by the IEEE 802 committee. The Ethernet is defined at the physical layer and the data link layer of the seven layers of an OSI reference model. However, for the present invention, the LAN protocol is not restricted to the Ethernet, and other LAN protocols such as a Token Bus (IEEE 802.4) or a Token Ring (IEEE 802.5) may be employed. The LAN 10 includes a fast wireless network based on the wireless LAN IEEE 802.11 protocol, which is also formulated by the IEEE 802 committee.

The LAN 10 is configured to include wireless base stations (also referred to as access point) 23 and 25, relay devices 27 and 28, a gateway server 15, an IP gateway server 17, a DHCP server 19, and the like. The relay devices 27 and 28 have respective MAC addresses stored in corresponding read-only memories (ROMs). The MAC address is a unique physical address assigned to a network device such as a LAN card and is configured by 48 bits in the Ethernet. Each of the relay devices 27 and 28 has 256 ports, to which different port addresses are allocated, respectively. The port address as used herein does not correspond to the port address that is processed in a transport layer, but to the address of a port on a physical layer, serving as the output ports of the relay devices 27 and 28.

As shown in FIG. 1, connectors 29a-29f are connected through a LAN cable to the respective ports of the relay device 27, and a connector 29g is connected through a LAN cable to the port of the relay device 28. The relay devices 27 and 28 functions as a switch of Layer 2, operating on the data link layer to thereby perform transmission of a MAC frame and is also operable to recognize all layers of the OSI reference model to thereby transmit the port addresses. The relay device 27 may be configured to include a switch operating on both the network layer at Layer 3 and the data link layer at Layer 2. Detailed description on the configuration of the relay device will be provided later.

The connectors 29a-29g are fixed at predetermined positions in a building, and users can attach and remove an IP-only phone 31 and a notebook PC 33 to and from any of the connectors by means of a LAN cable with an RJ-45 connector. The relay devices 27 and 28 and the connectors 29a-29g may be connected via an optical cable. FIG. 1 illustrates an example in which the IP-only phone 31 is connected to the connector 29a, while the notebook PC 33 is connected to the connector 29b. The DHCP server 19 is configured such that among a number of leased addresses (IP addresses) for a possible DHCP client: the notebook PC 33 or the IP-only phone 31, a single IP address is dynamically allocated to the DHCP client.

The notebook PC 33 is equipped with a wireless LAN device so it is able to wirelessly communicate with the wireless base stations 23 and 25. Moreover, the notebook PC 33 has incorporated therein an IP telephony program for implementing the functionalities of a soft phone. In the following description, the notebook PC 33 having the IP telephony program incorporated therein will be referred to as a soft phone 33a when attention is paid to an IP telephony service. Moreover, the soft phone 33a and the IP-only phone 31 will be collectively referred to as an IP phone when it is not necessary to distinguish between them.

The LAN 10 can configure an IP network for VoIP as well as a data communication network of a computer. The IP network implemented in the LAN 10 may employ an existing protocol such as H.323 standardized by ITU-T, one of the organizations of International Telecommunication Union (ITU) or SIP standardized by Internet Engineering Task Force (IETF). The IP gateway server 17 constructs an Internet Protocol Private Branch Exchange (IP-PBX) in the LAN 10.

The IP gateway server 17 is configured to interconvert protocols for call control or signaling and protocols for both voice and image data between the PSTN 13 and the LAN 10. After establishing communication between telephones through call control, the IP gateway server 17 assembles a packet from a voice signal received from the PSTN 13 to be delivered to an IP phone connected to the LAN 10 and converts a packet received from the IP phone into a voice signal to be delivered to the PSTN 13.

The IP gateway server 17 has an address table for interconversion between an IP address and a telephone number, the address table being referenced when controlling calls between the PSTN and the IP phone, or when controlling calls for internal extension calls between IP phones connected to the LAN 10 and establishing a session. Moreover, the IP gateway server 17 carries out authentication or registration of the IP phone and actualizes additional functions such as transfer or hold. The functionalities of the IP gateway server 17 may be distributed among multiple servers. The gateway server 15 is configured to relay the data transmission between the LAN 10 and the Internet 11.

The wireless base stations 23 and 25 are connected to the Ethernet of the LAN 10 in a wired manner, and the notebook PC 33 can be connected through the wireless base stations 23 and 25 to the LAN 10. The relay devices 23 and 25 form respective wireless cells 35 and 37 in spaces defined by the respective radio coverage to thereby configure a network operating in an infrastructure mode, between the relay devices and the notebook PC 33.

The notebook PC 33 can wirelessly communicate with the wireless base station 23 when positioned within the coverage of the wireless cell 35 while being able to wirelessly communicate with the wireless base station 25 when positioned within the coverage of the wireless cell 37. The wireless cell 35 may overlap with the wireless cell 37; in such a case, the notebook PC 33 establishes the wireless connection by selecting either one of the wireless base stations providing the stronger radio field intensity. In FIG. 1, the notebook PC 33 is present within the coverage of the wireless cell 35 and thus communications with the wireless base station 23 is established. The wireless base stations 23 and 25 are respectively provided with ROMs having their MAC addresses stored therein.

The IP-only phone 31 is equipped with an Ethernet interface but is similar to a normal business phone in its handset appearance or the arrangement of number keys. The IP-only phone 31 provides various telephone functionalities such as speed dialing, hold, and transfer, and thus can be used in a similar manner to the business phone. The IP-only phone 31 is ordinarily used by being placed on a user's desk 39. The soft phone 33a is assumed as being used by the same user as the IP-only phone 31 and, as illustrated in FIG. 1, is being placed on the desk 39. The IP-only phone 31 and the soft phone 33a share an identical telephone number.

Figure 2A:
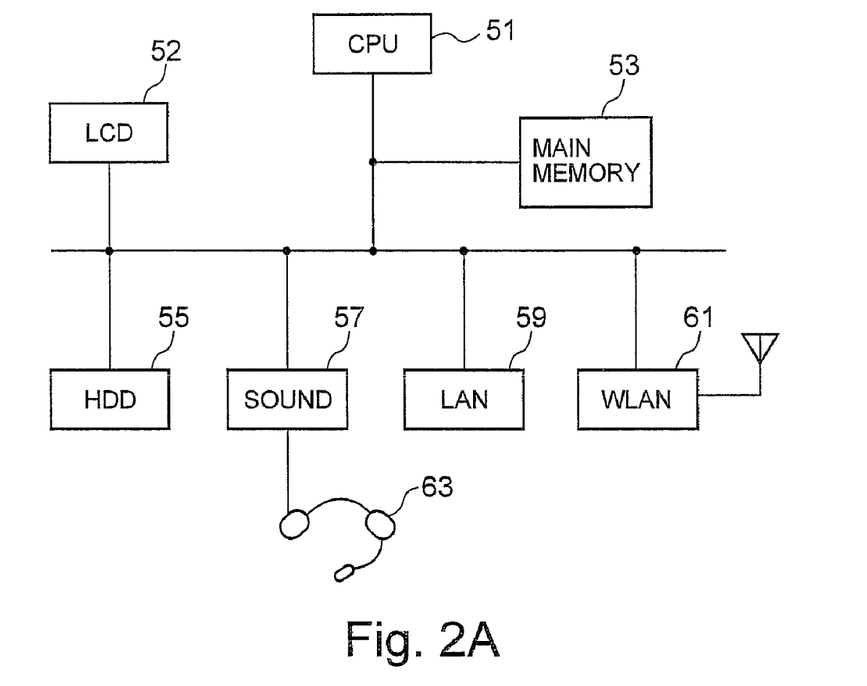
FIGS. 2A and 2B are block diagrams of the configuration of a notebook personal computer.
Figure 2B:
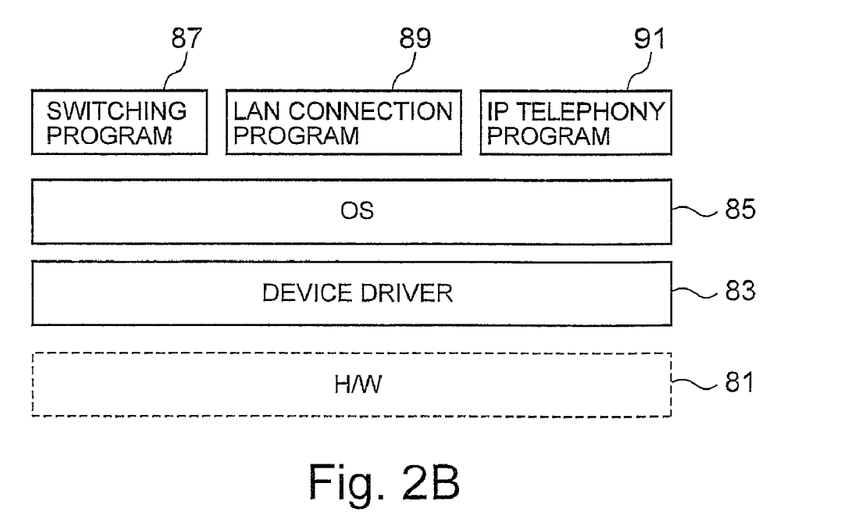

FIG. 2A is a block diagram of a simplified configuration of the notebook PC 33, and FIG. 2B is a block diagram of a simplified configuration of the software installed in the notebook PC 33. In FIGS. 2A and 2B, known elements having little relevancy to the present embodiment are omitted. The notebook PC 33 includes an IP telephony program 91, a LAN connection program 89, and a switching program 87 that execute the switching operation according to a preferred embodiment of the present invention. The IP telephony program 91 and the LAN connection program 89 are known ones. The notebook PC 33 can operate as the soft phone 33a once the IP telephony program 91 is executed. The notebook PC 33 can perform its data processing function as a notebook PC while it is operating as the soft phone 33a. A device driver 83 is the software for allowing an operating system (OS) 85 to control hardware 81.

The IP-only phone 31 is configured to convert voice into electric signals by means of hardware, while the soft phone is configured to generate a packet by converting voice into electric signals by means of the IP telephony program 91. The LAN connection program 89 controls operations for the wireless connection or the wired connection between the notebook PC 33 and the wireless base stations 23 and 25 or the relay devices 27 and 28. The switching program 87 performs switching operations between the IP-only phone 31 and the soft phone 33a. A central processing unit (CPU) 51 executes program read from a main memory 53 to perform a predetermined operation and controls the overall operation of the notebook PC 33. The main memory 53 temporarily stores therein programs executed by the CPU 51 or the device driver 83 or provides a work area to the CPU 51.

A hard disc drive 55 stores therein various programs shown in FIG. 2B, such as the OS 85 and the device drivers 83. A sound card 57 is connected a headset 63 having integrated therein a headphone and a microphone when the notebook PC 33 is used as a soft phone. The sound card 57 is configured to process a voice signal from the headset 63 to convert the voice signal into a digital signal or to convert digital voice data generated by the notebook PC 33 into an analog signal to be output to the headset.

A coder/decoder (CODEC) is installed in the sound card 57. The CODEC is configured by hardware and software and is configured to convert an analog signal into digital data, and vice versa, in order to transmit/receive the voice data in a streaming manner. Specifically, the CODEC samples, quantizes, and encodes the analog signal to thereby convert the signal into digital data to be encapsulated in a packet. The packet is exchanged through a wired LAN card 59 or a wireless LAN card 61 between the notebook PC and the LAN 10. Examples of the encoding method include a Pulse Code Modulation (PCM) method and a Code Excited Linear Prediction (CELP) method. The quality of the voice data depends on a sampling frequency or a quantization bit rate. When the sampling frequency or the quantization bit rate is set outside the range of the baud rate, the voice data cannot be transmitted in a streaming manner and thus the voice communication is interrupted.

The IP telephony program 91 is configured to receive information on the connection bandwidth (baud rate) of the wired communication or the wireless communication from the LAN connection program 89, so users can manually adjust the settings of the CODEC. Specifically, if the baud rate is high, the sampling frequency or the quantization bit rate is set to a high value, while it is set to a low value when the baud rate is low. In the present embodiment, when the soft phone 33a is wirelessly connected, the switching program 87 is configured to receive information on the connection bandwidth from the LAN connection program 89 to thereby change the operation parameters of the CODEC software to be suitable for the baud rate with the help of the IP telephony program 91.

The wired LAN card 59 is a network interface card (NIC) in compliance with the Ethernet protocol and is provided with an RJ-45 connector through which a LAN cable is connected. The wireless LAN card 61 is based on the protocol of the IEEE 802.11 and performs signal processing for communication between the notebook PC 27 and the wireless base stations 19 and 31. The wired LAN card 59 and the wireless LAN card 61 are all operating on the data link layer and the physical layer. The wired LAN card 59 and the wireless LAN card 61 are respectively provided with ROMs having their MAC addresses stored therein.

When the device driver 83 of the wired LAN card 59 and the wireless LAN card 61 is installed in the notebook PC 33, the MAC addresses stored in the respective ROMs are maintained on a memory of the LAN device driver of the notebook PC 33. Therefore, the MAC addresses are inserted as a destination MAC address in a frame delivered from the notebook PC 33 to the LAN 10. Since the MAC address is a number unique to each LAN card, the MAC address of the wired LAN card 59 has a different value from that of the MAC address of the wireless LAN card 61. An LCD 52 is a user interface of the notebook PC 33 for displaying a still picture or a moving picture.

Figure 3:
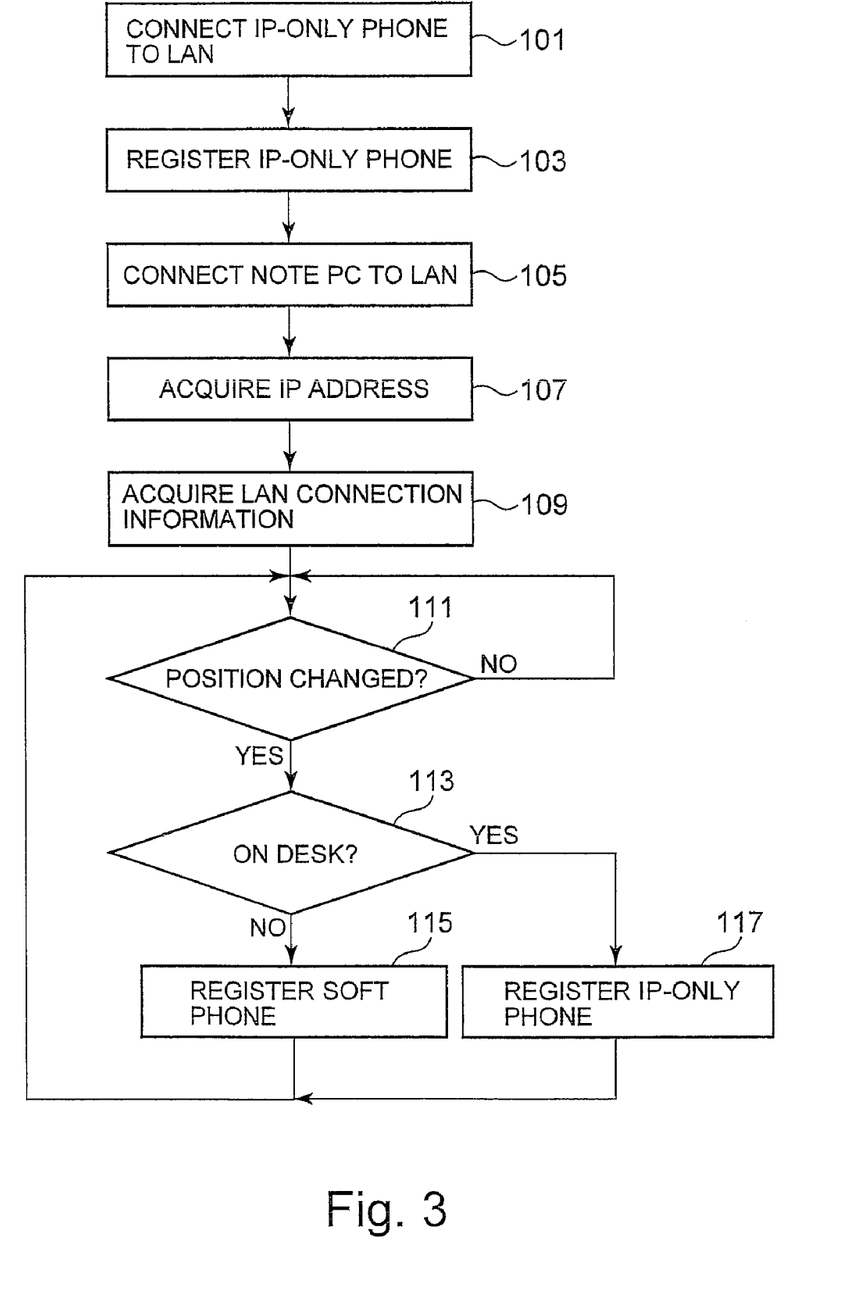
FIG. 3 is a high-level logic flow diagram of a method for switching between an IP-only phone and a soft phone, in accordance with a preferred embodiment of the present invention.

FIG. 3 is a flow chart illustrating a method for switching between the IP-only phone 31 and the soft phone 33a, according to a preferred embodiment of the present embodiment. The switching operation is mainly configured to acquire position information of the notebook PC 33 from connection information of the notebook PC 33 to the LAN 10 to thereby issuing a switching request to the IP gateway server 17 based on the acquired position information. Such an operation is automatically performed by the notebook PC 33 without any user intervention. In the Ethernet, data are transmitted in minimum units of a MAC frame, whereby the acquisition of the connection information and the issuing of the switching request are carried out.

The MAC frame includes an IP packet and an Ethernet header appended thereto, in which the IP packet includes user data created on the application layer and a TCP header and IP header appended thereto. In the Ethernet header, a destination MAC address and a source MAC address are set. In the destination MAC address, a broadcast address destined for all information terminals may be set. Moreover, the IP header contains a destination IP address and a source IP address.

In block 101, the IP-only phone 31 is connected to the connector 29a. The IP-only phone 31 broadcasts an IP address request frame to the LAN 10. As the source MAC address of the IP address request frame, an MAC address (04-A3-43-5F-43-23) of the NIC installed in the IP-only phone 31 is set. Upon receipt of the IP address request FeRAM, the DHCP server 19 selects an IP address (aa-bb-ccdd) among the leased addresses prepared therein and generates and delivers a frame in which the MAC address of the IP-only phone 31 is set as the destination MAC address.

The IP address of the IP gateway server 17 is publicized to a user by a supervisor of the LAN 10. Then, the user broadcasts an address resolution protocol (ARP) request frame from the IP-only phone 31 to the LAN 10 by the use of the publicized IP address to acquire the MAC address of the IP gateway server 17.

In block 103, the IP-only phone 31 sets the MAC address of the IP gateway server 17 as the destination address in an IP packet containing its own telephone number (12-3456789), the IP address (aa-bb-cc-dd), and a registration request message to thereby generate and deliver an MAC frame having appended thereto an Ethernet header, in which its own MAC address is set as a source address, to the LAN 10. The IP gateway server 17 reads out the IP address, the telephone number, and the MAC address of the IP-only phone 31 by unsealing the MAC frame received from the IP-only phone 31 and stores the read information in an address table to register the IP-only phone 31. In the registration, although user authentication is carried out, this will be omitted since it is not particularly related to the procedures.

Figure 4A:
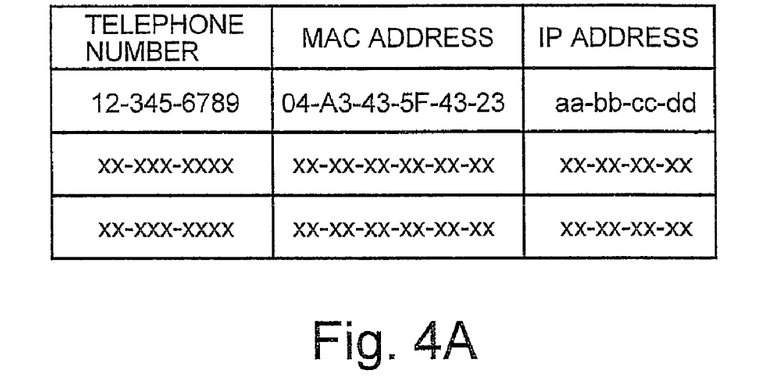
FIGS. 4A and 4B are diagrams illustrating a data structure of an address table of an IP gateway.

FIG. 4A is a diagram illustrating a data structure of a portion of the address table for registration of the IP-only phone 31. In the address table of the IP gateway server 17, telephone numbers, MAC addresses, and IP addresses are registered in a correlated manner. Upon completion of the registration operation of the IP-only phone 31, the IP-only phone 31 is able to make internal extension calls with other IP phones connected to the LAN 10 and external extension calls with other subscriber phones connected to the PSTN 13. During phone calls, a MAC frame including a counterpart telephone number input through an operation button of the IP-only phone 31 is delivered to the IP gateway server 17. When the counterpart telephone number is an internal extension number, the IP gateway server 17 acquires an IP address and a MAC address corresponding to the destination telephone number by referring to the address table and delivers the IP and MAC addresses to a counterpart IP phone, whereby a call control is carried out, and thereafter, a session for voice data communication is established between them.

When the counterpart telephone number is an external extension number, the IP gateway server 17 performs a call control by using data contained in the IP packet so that both phones are connected to each other and converts data protocols in a bi-directional manner to thereby establish a communication between the IP-only phone 31 and a subscriber phone connected to the PSTN 13. The same procedures are performed when the soft phone 33a is making phone calls. The notebook PC 33 is configured to be movable in a building and be connectable to the LAN 10 by being wired through the connectors 29a to 29g, or wirelessly connectable to the LAN 10 through the wireless base stations 23 and 25.

In block 105, the notebook PC 33 is connected to the connector 29b. Upon detection of the connection, the LAN connection program 89 broadcasts an IP address request frame to the DHCP server 19 over the LAN 10. In the MAC frame, the MAC address (05-B4-54-60-54-34) of the wired LAN card 59 is set as a source MAC address. Moreover, the LAN connection program 89 processes the IP address request frame and other frames in cooperation with hardware and software at each layer of the OSI reference model.

The DHCP server 19 generates an MAC frame in which the IP address to be allocated to the notebook PC 33 is set in the IP packet and delivers the MAC FeRAM to the notebook PC 33. Once the IP address is acquired, the notebook PC 33 is all prepared to deliver the MAC frame to information terminals connected to the LAN 10. Then, the LAN connection program 89 performs a user authentication operation by sending passwords or user IDs to an authentication server (not shown).

The LAN connection program 89 may connect to the wireless base station 23 instead of together with the wired communication. In such a case, the notebook PC 33 acquires the IP address from the DHCP server 19 in the same procedures. When the notebook PC 33 is connected to the LAN 10 in both wired and wireless manner, different IP addresses corresponding to the wired LAN card 59 and the wireless LAN card 61 are acquired.

The source MAC address contained in the Ethernet header of the MAC frame transmitted from the DHCP server 19 is changed by the relay device 27 to the MAC address of the relay device 27 when the MAC frame has passed through the relay device 27. In block 109, the switching program 87 recognizes the MAC address of the relay device 27 from the MAC frame transmitted from the DHCP server 19. The relay device 27 is fixed at a predetermined location in a building within a predetermined distance from the connector 29a or the relay device 27. Therefore, the switching program 87 can acquire the position information of the notebook PC 33 from the MAC address of the relay device 27.

In the present embodiment, the position information of the notebook PC 33 is the information necessary for determining as to whether the notebook PC 33 is positioned at a position close to the IP-only phone 31 so that it is convenient to use the IP-only phone 31. For example, the position information is the information allowing knowing whether the notebook PC 33 is placed on the desk 39 where it is usually used or at other places. The position information does not need to be accurate because it only needs to know whether or not the notebook PC is certainly on the desk. When one user has multiple IP-only phones 31 having the same telephone number, the convenient positions of the respective IP-only phones 31 may be set by the corresponding number.

In block 111, the physical distance between the notebook PC 33 and the desk 39 is determined. When the notebook PC 33 is used at a place distant from the desk 39 in a state where it is connected to the LAN 10, it may be convenient to switch from the IP-only phone 31 to the soft phone 33a since IP-only phones can only be used at the destination sites. In the present embodiment, the position information of the soft phone 33a is acquired from the connection information of the notebook PC 33 to the LAN 10 whereby the necessity of the switching operation is determined based on the position information. Since the connection between the notebook PC 33 and the LAN 10 can be made in both a wired manner by the Ethernet and in a wireless manner, the connection information for each of the connection manners will be described.

First, description will be given for the switching procedures when the notebook PC 33 is connected to the LAN 10 at a destination site in a wired manner. When the connection of the notebook PC 33 to the LAN 10 is changed from the connector 29b to the connector 29g, the LAN connection program 89 broadcasts an IP address request frame from the notebook PC 33 to the LAN 10.

In the MAC frame, the MAC address of the wired LAN card 59 is set as a source MAC address of the Ethernet header. The DHCP server 19 having received the IP packet selects one IP address (aa-bb-cc-de) among available leased addresses in a data field of the IP packet and delivers a MAC frame, in which the MAC address of the notebook PC 33 is set as a source MAC address, to the LAN 10.

The MAC frame delivered from the DHCP server 19 is transmitted via the relay device 28 to the notebook PC 33. The source MAC address contained in the MAC frame transmitted from the DHCP server 19 to the notebook PC 33 is changed to the MAC address of the relay device 28 by the relay device 28 when the MAC frame has passed through the relay device 28. The LAN connection program 89 reconfigures the notebook PC 33 with the IP address obtained by unsealing the MAC frame and delivers the MAC address of the relay device 28 to the switching program 87. Then, the switching program 87 is able to determine that the position of the notebook PC 33 has been changed by recognizing that the MAC address of the newly connected relay device 28 is different from the MAC address of the previously connected relay device 27. In such a case, the MAC address of the relay device is used as the connection information to the LAN 10 for acquisition of the position information.

Next, description will be given for the switching procedures when the notebook PC 33 is connected to the LAN 10 at a destination site in a wireless manner. When the position of the notebook PC 33 is moved away from the coverage of the wireless cell 35 and enters into the coverage of the wireless cell 37, the notebook PC 33 receives a strong beacon frame from the wireless base station 25. Then, the LAN connection program 89 performs authentication and connection of the notebook PC 33 to the wireless base station 25. The beacon frame contains a MAC address and a Service Set ID (SSID) of the wireless base station 25. When the notebook PC 33 is connected to the wireless base station 25, the switching program 87 is able to determine that the position of the notebook PC 33 has been changed by recognizing that the MAC address of the newly connected wireless base station 25 is different from the MAC address of the previously connected wireless base station 23. In such a case, the MAC address of the wireless base station is used as the connection information to the LAN 10 for acquisition of the position information.

When the switching program 87 determines in block iii based on the connection information that the position of the notebook PC 33 has been changed, the flow proceeds to block 113. Depending on the connection position of the notebook PC 33 to the LAN 10, the switching program 87 may determine that the position is not changed. In such a case, the switching program 87 enters a standby mode until it recognizes that the position of the notebook PC 33 has been changed. In block 113, the switching program 87 determines whether or not the position of the notebook PC 33 is on the desk 39. Specifically, the switching program 87 is configured to determine that the position of the notebook PC is on the desk when the MAC address of the relay device 27 or the MAC address of the wireless base station 23 is recognized as the connection information. On the other hand, when the MAC addresses of other relay devices or the MAC addresses of other wireless base stations are recognized as the connection information, the switching program 87 determines that the position of the notebook PC is distant from the desk. Information for determining whether it is on the desk or not may be registered by users providing a table so that the switching program 87 can refer to the table.

When the switching program 87 determines in block 113 that the position of the notebook PC 33 is distant from the desk 39, the flow proceeds to block 115. On the other hand, the flow proceeds to block 117 when it is determined to be on the desk 39. In block 117, the switching program 87 registers the IP-only phone 31 in the IP gateway server 17 through the procedures described in block 103. When the IP-only phone 31 is already registered in the address table of the IP gateway server 17, the switching program 87 maintains the existing registration.

In block 115, the notebook PC 33 delivers a MAC frame, in which the MAC address of the IP gateway server 17 is set as the destination MAC address in an IP packet containing its own IP address, a telephone number, and a switching request message, to the IP gateway server 17 over the LAN 10 through a wired connection or a wireless connection. The telephone number at this moment is the same as the telephone number allocated to the IP-only phone 31. The IP gateway server 17 stores the IP address, the telephone number, and the MAC address read by unsealing the MAC frame received from the notebook PC 33 to thereby register the soft phone 33a. When the IP-only phone 31 is already registered for the same telephone number, the IP gateway server 17 cancels the registration of the IP-only phone 31 so that only the soft phone 33a can be registered for that telephone number.

When the soft phone 33a is registered in a state where the notebook PC 33 is wirelessly connected to the LAN 10, the switching program 87 acquires information on a present connection bandwidth from the LAN connection pg 89 to thereby deliver operation parameters of the CODEC installed in the sound card 57, optimized for the connection bandwidth to the switch of the CODEC via the IP telephony program 91.

In blocks 103, 115, and 117, when either the IP-only phone 31 or the soft phone 33a is registered, the IP telephony program 91 displays the registration contents on the LCD 52. Moreover, on a screen of the IP-only phone 31, it is displayed whether the IP-only phone 31 is currently registered or not. Independently from the procedures shown in FIG. 3, a user can change the registration by operating buttons on the IP-only phone 31 or by inputting instructions through a keyboard of the notebook PC 33. For example, it may be considered a case in which the switching program 87 has recognized that the notebook PC 33 is positioned on the desk 39 and thus the IP-only phone 31 is registered for use. However, a user may wish to use the soft phone 33a because the position of the notebook PC 33 is not exactly on the desk; in such a case, the user can forcibly register the soft phone 33a through manual operations.

Figure 4B:
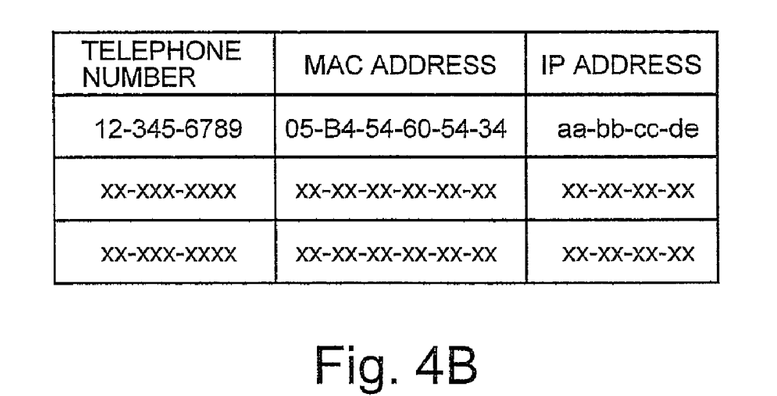

FIG. 4B is a diagram illustrating a data structure of a portion of the address table of the IP gateway server 17 when the soft phone 33a is registered. Comparing the address table with that shown in FIG. 4A shows that the MAC address and the IP address for the same telephone number are changed from the IP-only phone 31 to the soft phone 33a that is connected in a wired manner. The MAC address registered in this address table is one that was stored in the ROM of the wired LAN card 59. When the soft phone 33a is registered through both wired connection and wireless connection, the MAC address of the wireless LAN card 61 for the same telephone number and an IP address allocated to the MAC address are additionally stored in the address table. When the soft phone 33a is registered through only the wireless connection, only the MAC address of the wireless LAN card 61 and the IP address allocated to the MAC address are stored in the address table for that telephone number.

When the registration operation is completed and the soft phone 33a is completely logged on the IP gateway server 17 under the control of the switching program 87, the soft phone 33a can make and catch calls through both internal and external extensions in lieu of the IP-only phone 31. When the processing of blocks 115 and 117 is completed and either the IP-only phone 31 or the soft phone 33a is made available, the flow returns to block 111, where the switching program 87 monitors the connection information to make determination as to whether or not the position of the notebook PC 33 is changed.

When making determination in block 111, there may be a case where the connection position of the notebook PC 33 to the LAN 10 is changed from the connector 29b to the connector 29c. It is assumed that when the notebook PC is connected to the connector 29c, the notebook PC 33 is present at a place distant from the desk 39. In such a case, since the relay device at the connection destination is not changed, the switching program 87 is not able to recognize the positional change of the notebook PC 33. Moreover, since the wireless base station to which the notebook PC is wirelessly connected is not changed within the coverage of the same wireless cell 35, the switching program 87 is not able to recognize the positional change of the notebook PC 33. The present embodiment provides two methods that enable the switching program 87 to recognize the positional change of the notebook PC 33. According to a first method, a port address of the relay device 27 is used in making determination as to whether or not the position of the notebook PC 33 is changed. However, the port address of the relay device is not contained in the MAC frame. The port address acquisition method will be described later with reference to FIGS. 5A and 5B that show the internal structure of the relay device 27.

According to a second method, a received signal intensity indicator (RSSI) of an electromagnetic wave transmitted by a wireless base station is measured. In an infrastructure mode, the wireless base stations 23 and 25 periodically transmit a beacon frame. The LAN connection program 89 can measure the RSSI from a preamble of the beacon frame transmitted from the wireless base station 23 by means of a receiver circuit of the wireless LAN card 61. Since the RSSI varies as the distance between the notebook PC 33 and the wireless base station 23 varies within the coverage of the wireless cell 35, it is possible to determine whether the notebook PC 33 is placed on the desk 39 or at a distant position from the desk 39.

When the switching program 87 recognizes from the value of the RSSI received from the LAN connection program 89 that the RSSI value is changed by a predetermined value or more from the value when the notebook PC 33 is placed on the table 39, the switching program 87 issues a registration request to the IP gateway server 17 by connecting to the LAN 10 through the connector 29c. Upon completion of the registration, the soft phone 33a can be used through wired connection in lieu of the IP-only phone 31. In this case, the RSSI value of an electromagnetic wave transmitted by the wireless base station is used as the connection information to the LAN 10 for acquisition of the position information.

The notebook PC 33 can measure the RSSI value of the wireless base station 25 when it moves in a state where it is connected to the wireless base station 23. When the RSSI value of the wireless base station 25 increases to a predetermined value or more, the switching program 87 determines that the notebook PC 33 is at a distant position from the desk 39 and issues a registration request to the IP gateway server 17 through wired connection via the relay device 27 or through wireless connection via the wireless base station 23. In such a case, the RSSI value of an electromagnetic wave transmitted by a wireless base station adjacent to the currently connected wireless base station is used as the connection information to the LAN 10 for acquisition of the position information.

Figure 5A:
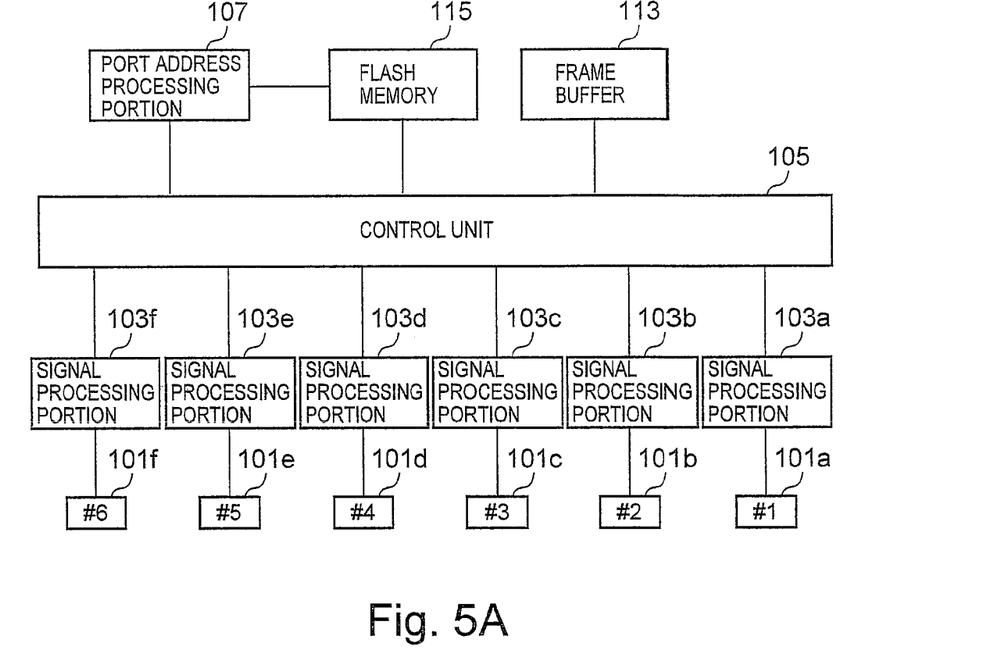
FIGS. 5A and 5B are block diagrams of the configuration of a relay device.

Subsequently, a method for determining the positional change of the notebook PC 33 based on the port address of the relay device 27 will be described. FIGS. 5A and 5B are block diagrams illustrating a simplified construction of the relay device 27. In FIG. 5A, RJ-45 connectors 101a to 101f correspond to physical ports #i to #6 to which an external LAN cable is connected, and 8-bits port addresses 00 to 05 are allocated to the connectors, respectively. To the ports #1 to #6, the connectors 29a to 29f shown in FIG. 1 are connected through LAN cables. Signal processing portions 103a to 103f are respectively connected through the connectors 101a to 101f to a control unit 105, and are operated on the physical layer, whereby external electric signals and internal digital signals are converted in a bidirectional manner. Only portions of the connectors and signal processing portions are illustrated in the drawings.

The control unit 105 controls an overall operation so that the relay device 27 operates as a switch that transmits the MAC frame on the data link layer. The control unit 105 delivers the MAC frame generated by a port address processing portion 107 to the LAN 10 through a predetermined port address connector. The control unit 105 encodes the MAC frame or decodes the MAC frame. The MAC address of the relay device 27 is stored in a ROM of the control unit 105.

Figure 5B:
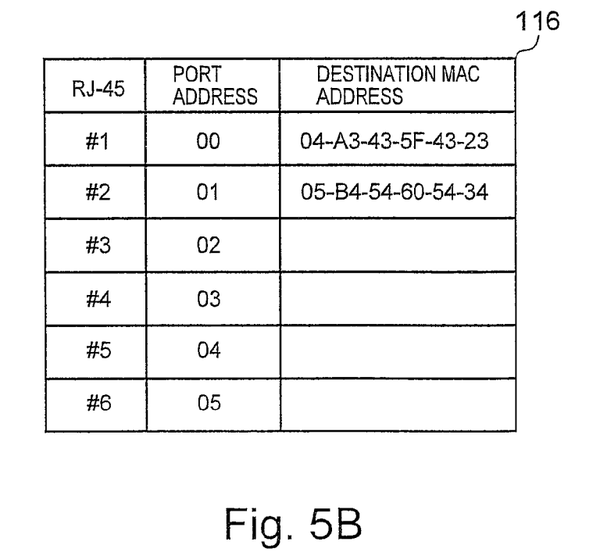

A buffer frame 113 is connected to the control unit 105 and temporarily stores therein the MAC frames that have been transmitted from the outside through the respective ports. A flash memory 115 is connected to the control unit 105 and stores an address table 116 designed for the MAC addresses and the port addresses of the connectors 101a to 101f. FIG. 5B shows the data structure of the address table 116. As shown in FIG. 1, the IP-only phone 31 is connected to the port #i, while the notebook PC 33 is connected to the port #2. In the address table 116, the MAC addresses of information terminal equipments connected to the respective ports are registered as the destination MAC address.

The port address processing portion 107 is connected to the control unit 105 and the flash memory 115 and is configured to generate, in response to a port address request frame received from the information terminal connected to the respective ports #1 to #6, an IP packet on a MAC frame containing the port address of the connector to which the information terminal is connected, and thereby return the generated packet to the information terminal via the control unit 105. The port address may be specified in a control field of a logical link control (LLC) field of the MAC frame, which is defined at the first 8 bytes in the data frame of the IP packet.

Next, the transmission of the MAC frame by the relay device 27 will be described. Upon receipt of a MAC frame from an information terminal newly connected to either one of the connectors 101a to 101f, the control unit 105 registers the port address of the connector and the MAC address of the information terminal in the address table 116. Then, the control unit 105 stores the MAC frames received from the information terminals in the frame buffer 113.

The control unit 105 investigates the port addresses corresponding to the destination MAC address of the MAC frame stored in the frame buffer 113 by referring to the address table 116 to thereby deliver the MAC frame through only the connector corresponding to the port address, whereby a full-duplex communication is implemented in the relay device 27. When it is impossible to find the destination MAC address of the MAC frame stored in the frame buffer 113 from the address table 116, the control unit 105 delivers the MAC frame through the entire ports except the reception port. Moreover, when a predetermined time has elapsed, the control unit 105 learns the relationship between the port address and the destination MAC address by eliminating the whole data in the frame buffer 113 to thereby store the learning in the frame buffer 113.

Subsequently, description will be given for the procedures wherein the relay device 27 delivers the port address of the connector, to which the notebook PC 33 is connected, in response to the request from the notebook PC 33. Since the MAC address does not contain the port address of the switch on Layer 2 or Layer 3, a special measure is required for acquisition of the port address. When the user removes the notebook PC 33 from the connector 29b and connects it to the connector 29c connected to the port #3, as described with reference to block iii of FIG. 3, the LAN connection program 89 acquires the IP address from the DHCP server 19 to thereby connect the notebook PC 33 to the LAN 10. The switching program 87 creates a message to acquire the port address of the port #3 that is currently in connection. Then, the notebook PC 33 generates a port address request IP packet, in which the message is set in the data field, and delivers the IP packet to the LAN 10 through a MAC frame in which the MAC address of the relay device 27 is set as the destination MAC address.

Upon recognition that the destination MAC address of the MAC frame received from the notebook PC 33 is identical to its own address, the control unit 105 delivers the MAC frame to the port address processing portion 107 without storing the frame in the frame buffer 113. Then, the port address processing portion 107 decrypts the message by unsealing the IP packet. Then, the MAC address processing portion 107 acquires a port address (02) corresponding to the MAC address of the wired LAN card 59, which is the source MAC address of the MAC frame, by referring to the address table 116.

Upon acquisition of the port address, the port address processing portion 107 sets the port address in the data field and generates a MAC frame, in which the MAC address of the wired LAN card 59 is set as the destination MAC address, to thereby return the generated MAC frame to the notebook PC 33. As a result, the switching program 87 is able to acquire the port address of the currently connected Ethernet. The port address of the Ethernet differs from connector to connector; therefore, the switching program 87 is able to acquire the position information with higher precision than the case of acquiring the position information from the MAC address of the relay devices 23 and 25. In such a case, the port address of the relay device is used as the connection information to the LAN 10 for acquisition of the position information. The various connection information described above may be used singly or in combination for determination on the position information.

As has been described, the present invention provides a method for switching connections between an IP-only phone and a soft phone to an IP gateway server.

It is also important to note that although the present invention has been described in the context of a fully functional telephone network, those skilled in the art will appreciate that the mechanisms of the present invention are capable of being distributed as a computer program product.

While the invention has been particularly shown and described with reference to a preferred embodiment, it will be understood by those skilled in the art that various changes in form and detail may be made therein without departing from the spirit and scope of the invention.

What is claimed is:

1. A method comprising:
    allocating identical telephone numbers to an IP-only phone and a soft phone, wherein said IP-only phone is connected to a local-area network (LAN) having a server capable of administrating telephone numbers, wherein said soft phone is wirelessly connected to said LAN;
    in response to an incoming call, determining whether or not said soft phone has been moved beyond a predetermined distance from said IP-only phone;
    in a determination that said soft phone has not been moved beyond said predetermined distance from said IP-only phone, routing said incoming call to said IP-only phone; and
    in a determination that said soft phone has been moved beyond said predetermined distance from said IP-phone, routing said incoming call to said soft phone.

2. The method of claim 1, wherein said IP-only phone includes a telephone transceiver and telephone buttons.

3. The method of claim 1, wherein said soft phone is a portable computer having an IP telephony software for converting voice into computer signals.

4. The method of claim 1, wherein said soft phone has been moved beyond said predetermined distance from said IP-only phone when said soft phone's connection destination to said LAN changes from a first connector to a second connector.

5. The method of claim 1, wherein said soft phone has been moved beyond said predetermined distance from said IP-only phone when a relay device within said server for said soft phone has been changed from a first relay device to a second relay device.

6. The method of claim 1, wherein said connection information includes an intensity value of a received signal of an electromagnetic wave transmitted from a wireless base station connected to said soft phone via said wireless connection.

7. The method of claim 1, wherein said determining further includes determining whether or not said soft phone has been moved beyond said predetermined distance from said IP-only phone based on connection information of said soft phone to said LAN.

8. A computer readable device having a computer program product for switching connections between an IP-only phone and a soft phone, said computer readable device comprising:
    computer program code for allocating identical telephone numbers to an IP-only phone and a soft phone, wherein said IP-only phone is connected to a local-area network (LAN) having a server capable of administrating telephone numbers, wherein said soft phone is wirelessly connected to said LAN;
    computer program code for, in response to an incoming call, determining whether or not said soft phone has been moved beyond a predetermined distance from said IP-only phone;
    computer program code for, in a determination that said soft phone has not been moved beyond said predetermined distance from said IP-only phone, routing said incoming call to said IP-only phone; and
    computer program code for, in a determination that said soft phone has been moved beyond said predetermined distance from said IP-phone, routing said incoming call to said soft phone.

9. The computer readable device of claim 8, wherein said IP-only phone includes a telephone transceiver and telephone buttons.

10. The computer readable device of claim 8, wherein said soft phone is a portable computer having an IP telephony software for converting voice into computer signals.

11. The computer readable device of claim 8, wherein said soft phone has been moved beyond said predetermined distance from said IP-only phone when said soft phone's connection destination to said LAN changes from a first connector to a second connector.

12. The computer readable device of claim 8, wherein said soft phone has been moved beyond said predetermined distance from said IP-only phone when a relay device within said server for said soft phone has been changed from a first relay device to a second relay device.

13. The computer readable device of claim 8, wherein said connection information includes an intensity value of a received signal of an electromagnetic wave transmitted from a wireless base station connected to said soft phone via said wireless connection.

14. The computer readable device of claim 8, wherein said computer program code for determining further includes computer program code for determining whether or not said soft phone has been moved beyond said predetermined distance from said IP-only phone based on connection information of said soft phone to said LAN.

* * * * *